United States Patent
Hallak

(10) Patent No.: US 7,660,138 B2
(45) Date of Patent: Feb. 9, 2010

(54) METHOD FOR OPERATING AN INVERTER INCLUDING BOOS, BUCK, AND CUK CONVERTER TOPOLOGIES AND ARRANGEMENT FOR EXECUTING THE METHOD

(75) Inventor: Jalal Hallak, Vienna (AT)

(73) Assignee: Siemens AG Osterreich, Vienna (AT)

( * ) Notice: Subject to any disclaimer, the term of this patent is extended or adjusted under 35 U.S.C. 154(b) by 373 days.

(21) Appl. No.: 11/628,901

(22) PCT Filed: May 18, 2005

(86) PCT No.: PCT/EP2005/005394

§ 371 (c)(1),
(2), (4) Date: Dec. 8, 2006

(87) PCT Pub. No.: WO2005/122371

PCT Pub. Date: Dec. 22, 2005

(65) Prior Publication Data

US 2008/0266921 A1    Oct. 30, 2008

(51) Int. Cl.
*H02M 7/537* (2006.01)
(52) U.S. Cl. .......................................... 363/97; 363/131
(58) Field of Classification Search .................. 363/131, 363/95
See application file for complete search history.

(56) References Cited

U.S. PATENT DOCUMENTS 4,354,223 A    10/1982    Turnbull 5,057,990 A  * 10/1991   Gulczynski ................. 363/131
6,515,883 B2 *  2/2003   Wade ......................... 363/123

FOREIGN PATENT DOCUMENTS

JP    2002507110 A    3/2002

OTHER PUBLICATIONS

"The Four Boostbuck Topologies", Online, 2003, pp. 1-2, URL: http://www.boostbuck.com/TheFourTopologies.html, Retrieved from Internet on Nov. 16, 2005, XP002354362.
Sanjaya Maniktala, "Slave Converters Power Auxiliary Outputs", EDN Magazine, Oct. 17, 2002, pp. 1-3.
Jun Kikuchi, Thomas A. Lipo, "Three Phase PWM Boost-Buck Rectifiers with Power Regenerating Capability", Conference record of 2001IEEE Industry Applications Conference, 36th IAS Annual Meeting, Chicago, IL Sep. 30-Oct. 4, and Conference record of IEEE Industry Applications Conference, IAS Annual Meeting, New York, NY, vol. 1 of 4, Conf. 36, Sep. 30, 2001. pp. 308-315, XP010561721, ISBN: 0-7803-7114-3.
D M Penalver, J Peire, P M Martinez, "Microprocessor Control of DC/AC Static Converters", IEEE Transactions on Industrial Electronics, 1985, p. 1, vol. IE-32, No. 3.

* cited by examiner

*Primary Examiner*—Jeffrey L Sterrett
*Assistant Examiner*—Manuel Hernandez

(57) ABSTRACT

The invention relates to a method for operating an electronically controlled inverter, said method being characterized in that the inverter is controlled during the positive half-wave of the output alternating voltage in such a way that it operates as a step-up converter/step-down converter cascade, and during the negative half-wave of the output alternating voltage in such a way that it operates as a CUK converter.

4 Claims, 6 Drawing Sheets

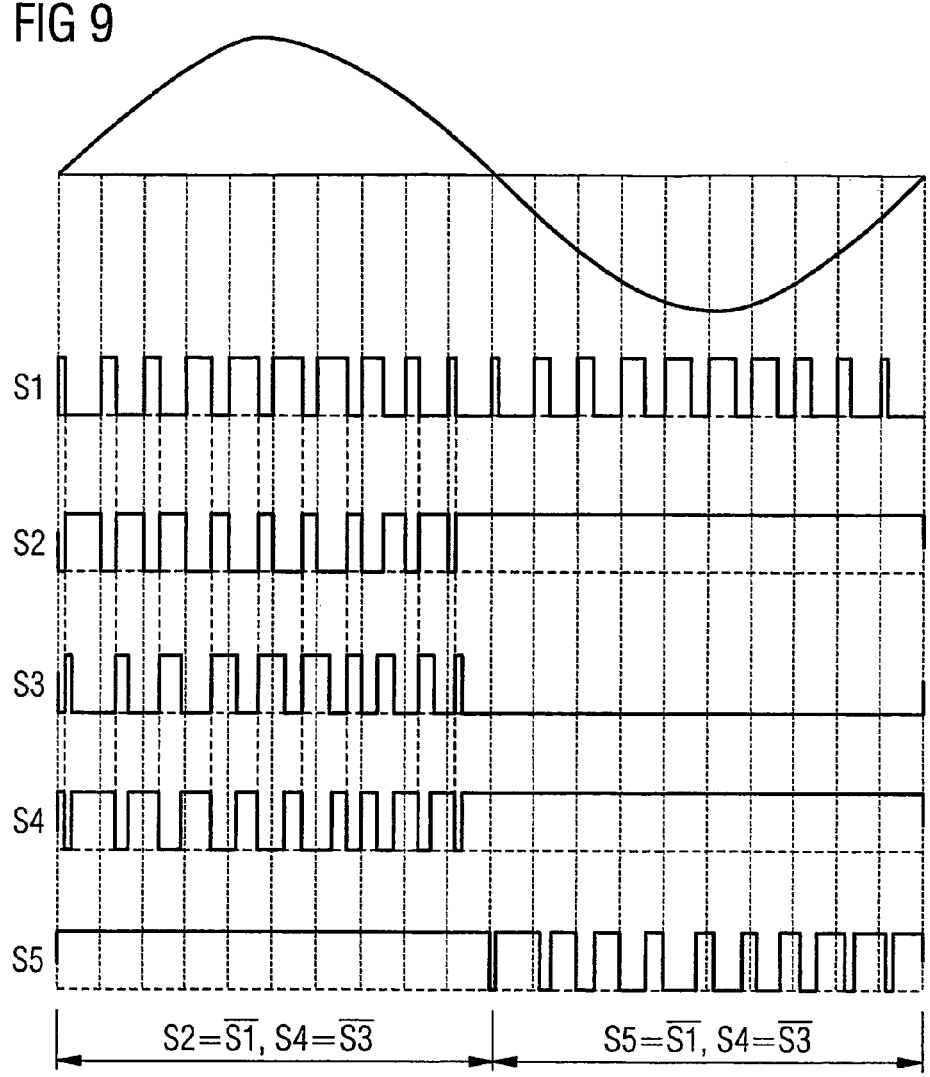

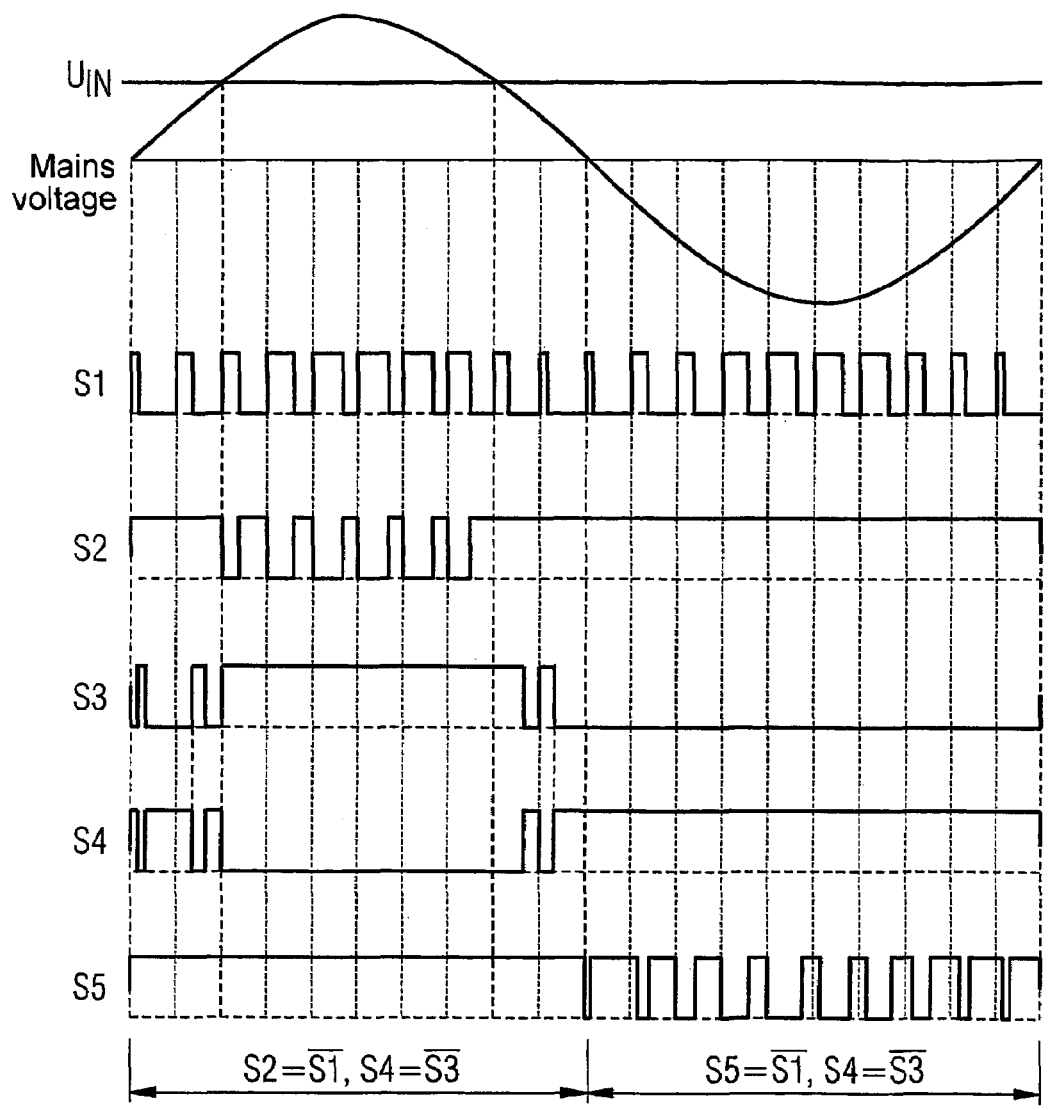

US 7,660,138 B2

METHOD FOR OPERATING AN INVERTER INCLUDING BOOS, BUCK, AND CUK CONVERTER TOPOLOGIES AND ARRANGEMENT FOR EXECUTING THE METHOD

CROSS REFERENCE TO RELATED APPLICATIONS

This application is the US National Stage of International Application No. PCT/EP2005/005394, filed May 18, 2005 and claims the benefit thereof. The International Application claims the benefits of Austrian Patent application No. A994/2004 filed Jun. 8, 2004. All of the applications are incorporated by reference herein in their entirety.

FIELD OF INVENTION

The invention relates to a method for operating an electronically controlled inverter and to an arrangement for executing the method.

BACKGROUND OF THE INVENTION

Electronically controlled inverters are for example known from US-Z.: C. M. Penalver, et al "Microprocessor Control of DC/AC Static Converters"; IEEE Transactions on industrial Electronics, Vol. IE-32, No. 3, 1985, P. 186-191. They are used for example in solar power systems to transform the direct current created by the solar cells in such as way as to enable it to be fed into the public AC power network. Only in this way is a practically unrestricted use of solar-produced energy guaranteed.

One of the results of the plurality of applications for inverters has been the development of basic derivative types of step-up converters, step-up/step-down converters and step-down converters for specific applications. An article published in the periodical EDN dated 17 Oct. 2002 "Slave converters power auxiliary outputs", Sanjaya Maniktala is cited here as an example in which different possible combinations of basic inverter types are described.

SUMMARY OF INVENTION

The object of the invention is to further develop the inverters known from the prior art.

In accordance with the invention the object is achieved with a method of the type mentioned at the start, in which the inverter is controlled during the positive half-wave of the output alternating voltage in such a way that it operates as a step-up converter/step-down converter cascade and in which the inverter is controlled during the negative half-wave of the output alternating voltage in such a way that it operates as a CUK converter.

The inventive combination of the functions of step-up/step-down converter and CUK converter result in an especially low-loss inverter which is thus highly efficient and is therefore particularly suited for use in solar systems.

It is advantageous for a single-phase inverter with two direct current terminals, two alternating current terminals and a number of semiconductor switches controlled by microcontrollers to be provided as an inverter.

It is advantageous for the inverter to include a first limiting choke, of which the first side is connected to the positive pole of a direct current source and of which the second side is connected via a first semiconductor switch to the negative pole of the direct current source, for the second side of the first choke to be connected via the series circuit of a second semiconductor switch and of a third semiconductor switch to the first terminal of a second choke of which the second terminal is connected to a first terminal of an alternating current output, for the connection of second and third semiconductor switch to be connected via a first capacitor and a fifth semiconductor switch to the second terminal of the alternating current output, for the negative pole of the direct current source to be connected to the second terminal of the alternating current output and for the connection of first capacitor and fifth semiconductor switch to be connected via a fourth semiconductor switch to the first terminal of the second choke.

It is also especially advantageous, during the positive half-wave of the output alternating voltage for the first, second, third and fourth semiconductor to be pulsed and the fifth semiconductor switch to be permanently switched on by means of microcontrollers, and for first and second semiconductor switches as well as third and fourth semiconductor switches to be switched in the opposing phase in each case and, during the negative half-wave of the output alternating voltage, for the first and fifth semiconductor switches to be switched pulsed in the opposing phase, and in this period for the second and the fourth semiconductor switches to be permanently switched on and the third semiconductor switch to be permanently switched off.

With an inverter for executing the inventive method it is useful for a microcontroller to be provided which is appropriately programmed for controlling the semiconductor switches.

BRIEF DESCRIPTION OF THE DRAWINGS

The invention is explained in greater detail with reference to Figures. The Figures typically show.

DETAILED DESCRIPTION OF INVENTION

The inverter shown in the figures comprises a first limiting choke L1, of which the first side is connected to the positive pole of a direct current source $U_{IN}$ and of which the second side is connected via a first semiconductor switch S1 to the negative pole of the direct current source $U_{IN}$.

The second side of the first choke L1 is connected via the series circuit of a second and of a third semiconductor switch S2, S3 to the first terminal of a second choke L2, of which the second terminal is connected to a first terminal of an alternating current output $U_{OUT}$. The connection of second and third semiconductor switch S2, S3 is connected via a first capacitor Cc and a fifth semiconductor switch S5 to the second terminal of the alternating current output $U_{mains}$, a connection is also provided between the negative pole of the direct current source and the second terminal of the alternating current output and the common point of first capacitor $C_C$ and fifth semiconductor switch S5 is connected via a fourth semiconductor switch S4 to the first terminal of the second choke L2. A second capacitor $C_i$ is connected to the direct current source $U_{IN}$ and a third capacitor $C_o$ is connected to the alternating current output $U_{OUT}$. Furthermore, the semiconductors S1, S2, S3, S4 and S5 are controlled by a microcontroller M.

Figure 1:
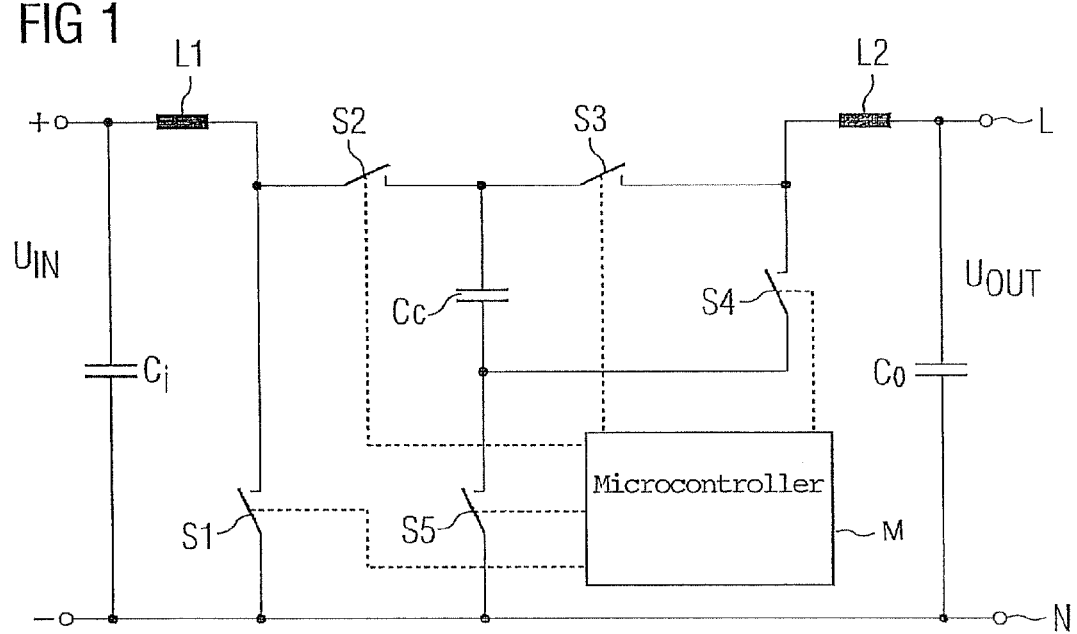
FIG. 1 the circuit diagram of a typical inverter FIG. 2 the circuit diagram of a typical inverter when MOSFETs are used.
Figure 2:
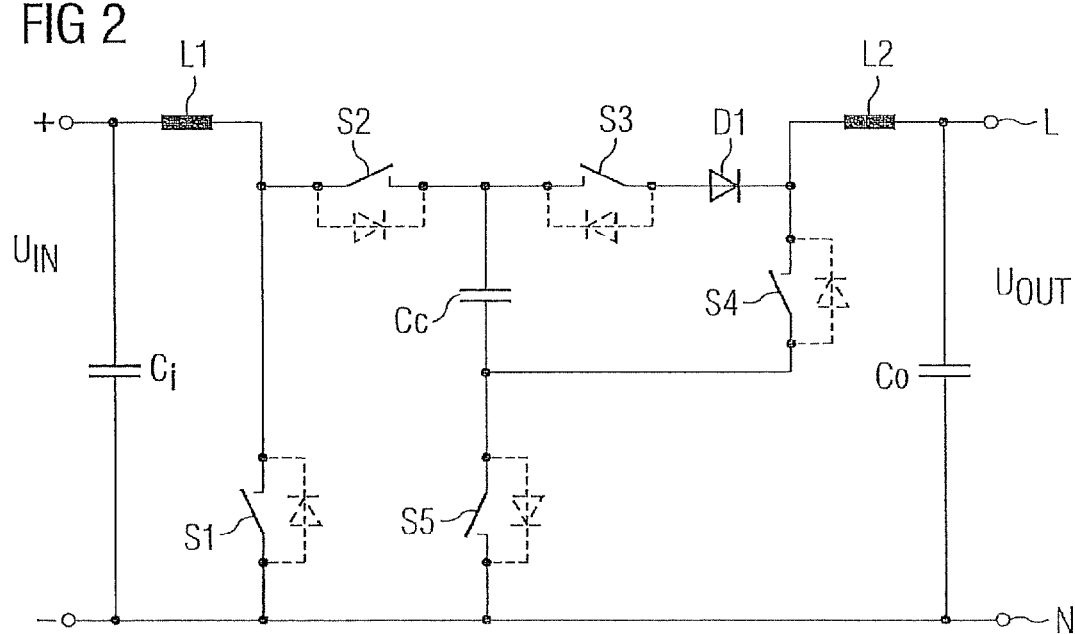

When n-channel barrier layer MOSFETs are used as semiconductor switches S1, S2, S3, S4, S5, the direction of installation should be noted, indicated in FIG. 2 by the diode symbol shown as a dashed outline.

In this embodiment of the invention the use of a diode D1 is worthwhile, of which the function can however also be implemented by a corresponding activation of the semiconductor switches.

The semiconductor switches are activated by microcontrollers (not shown).

In this case, in accordance with the invention, the output alternating current of the first, second, third and fourth semiconductor switches S1, S2, S3, S4 is pulsed during the positive half-wave and the fifth semiconductor switch S5 is permanently switched on, with first and second semiconductor switches S1, S2 and also third and fourth semiconductor switches S3, S4 being switched in the opposing phase in each case. During the negative half-wave of the output alternating current first and fifth semiconductor switches S1, S5 are switched pulsed in the opposing phase and the second and the fourth semiconductor switches S2, S4 are permanently switched on. The third semiconductor switch S3 is permanently switched off during this period.

Figure 3:
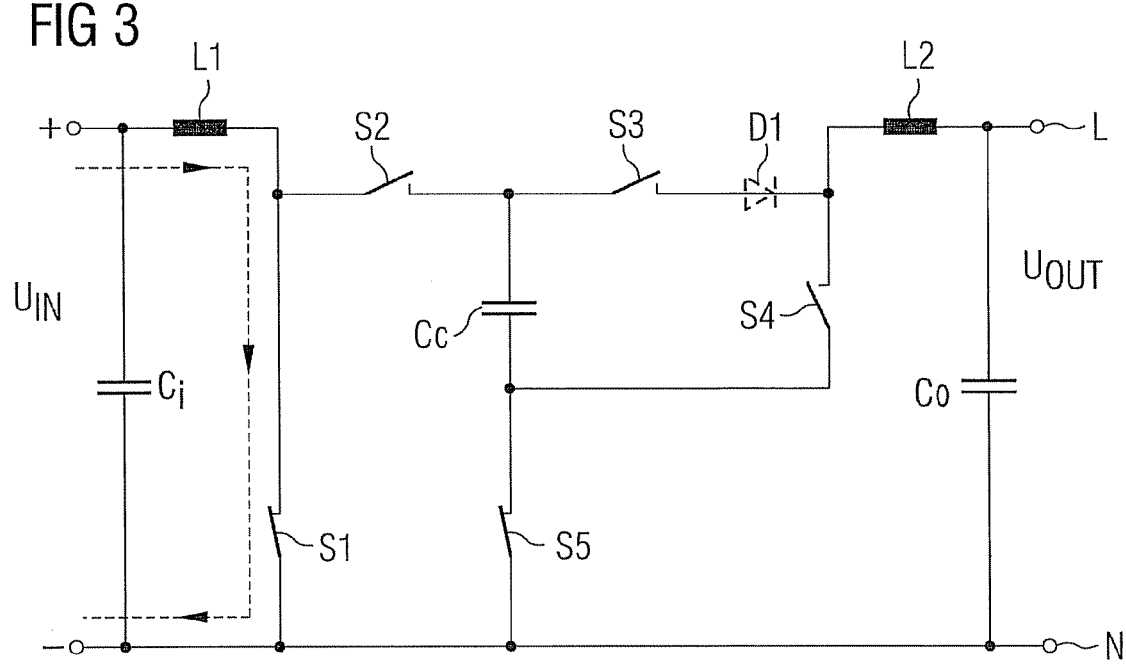
FIGS. 3, 4, 5 and 6 current flow and switching states in a typical inverter during the positive half-wave of the output alternating current, FIGS. 7 and 8 current flow and switching states in a typical inverter during the negative half-wave of the output alternating current, as well as FIGS. 9 and 10 the timing of typical activation signals AS for the semiconductor switches.

FIG. 3 in this case shows the state in which the inverter accepts electrical energy from the direct current source $U_{IN}$ during a positive half-wave of the output voltage. To this end the first semiconductor switch S1 is closed and thereby a current path established between the positive pole of the direct current source $U_{IN}$ via the first choke L1 and the first semiconductor switch S1.

Figure 4:
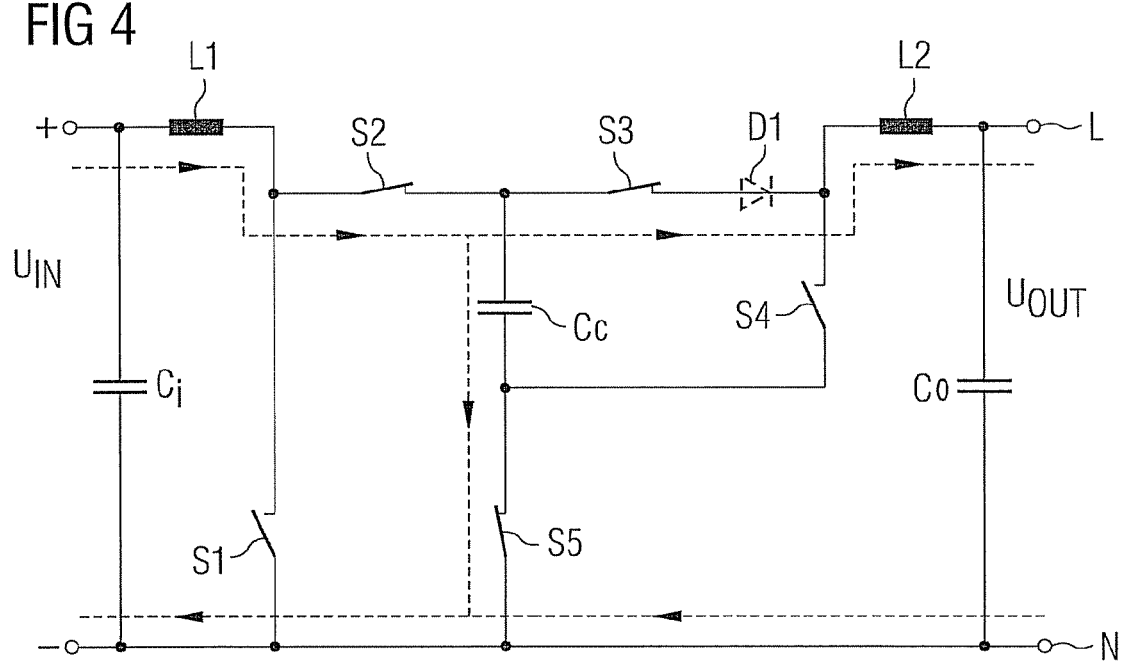

In this state the first choke L1 stores energy, which, as shown in FIG. 4, is output after the opening of the first semiconductor switch S1, with the second and third semiconductor switches S2, S3, now closed via the second choke L to the alternating current output $U_{OUT}$.

The circuit produced here runs from the positive pole of the direct current source $U_{IN}$ via the first choke L1, the second and the third semiconductor switches S2, S3 via the second choke L2 to the alternating current output $U_{OUT}$ and via the alternating current network to the negative pole of the direct current source $U_{IN}$. The second choke L2 stores energy in this case. At the same time the first capacitor $C_C$ is charged as a result of the fact that the fifth semiconductor switch S5 is also closed.

Figure 5:
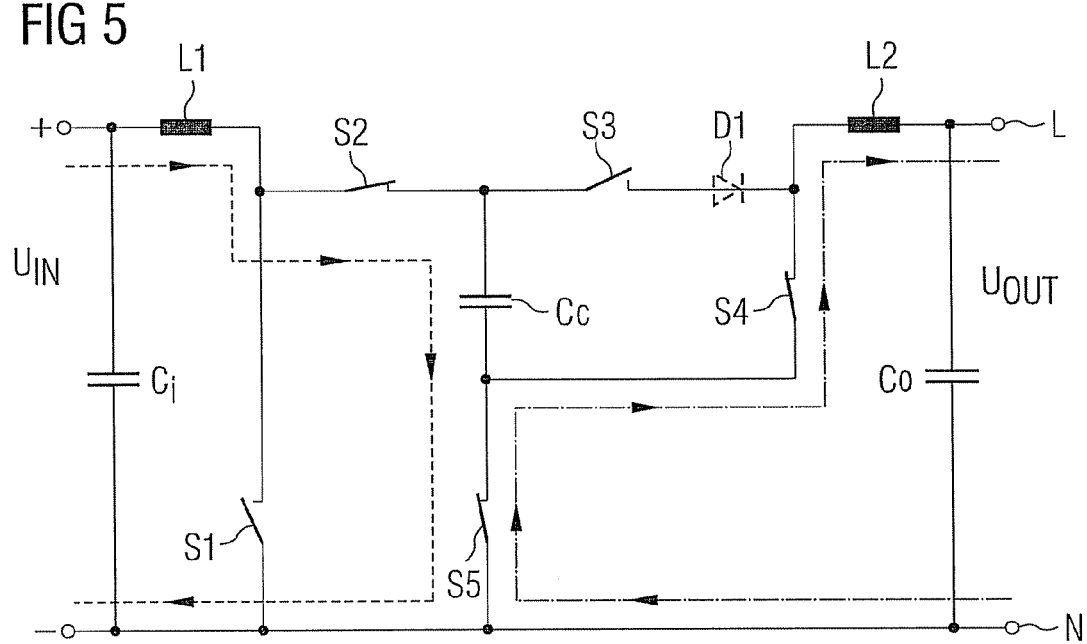

In the next switching process—as shown in FIG. 5—the third semiconductor switch S3 is opened and the fourth semiconductor switch S4 is closed.

A circuit is formed via the second choke L2, the alternating current network $U_{OUT}$, and the fifth and the fourth semiconductor switch S5, S4, with the second choke outputting the stored energy to the alternating current network $U_{OUT}$.

At the same time a further circuit runs from the positive pole of the direct current source $U_{IN}$ via the first choke L1, the second semiconductor switch S2 via the first capacitor $C_C$ and the fifth semiconductor switch S5 to the negative pole of the direct current source $U_{IN}$.

Figure 6:
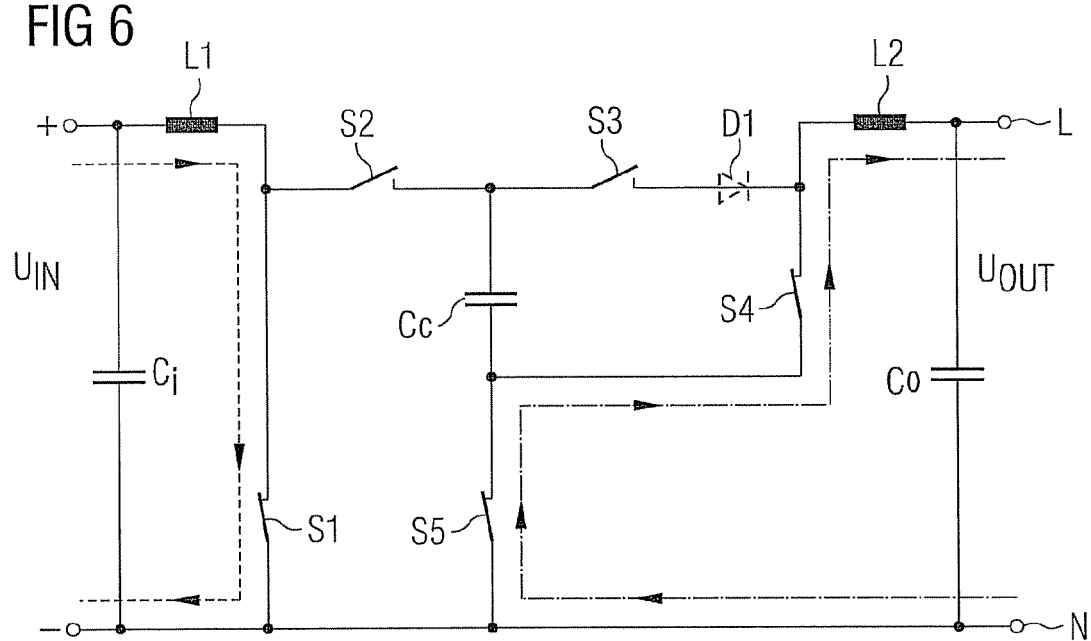

With the switching state shown in FIG. 6 a switching cycle is concluded during the positive half-wave.

The first semiconductor switch S1 is closed and thereby a current path is produced between the positive pole of the direct current source $U_{IN}$ via the first choke L1 and the first semiconductor switch S1. The inverter accepts electrical energy from the direct current source $U_{IN}$.

Simultaneously the second choke L2 issues energy to the alternating current network $U_{OUT}$ since the corresponding circuit is still closed via the fifth and the fourth semiconductor switch S5, S4, which is only interrupted on opening of the fourth semiconductor switch S4, whereby the switching state shown in FIG. 4 is also reached again.

The switching states during the negative half-wave of the output alternating current are now explained with reference to FIG. 7 and FIG. 8. As can also be seen from FIG. 9 and FIG. 10, the first and the fifth semiconductor switches S1, S5 are switched pulsed in the opposing phase, the second and the fourth semiconductor switches S2, S4 are permanently switched on and the third semiconductor switch (S3) is permanently switched off. This means that in accordance with the invention the function of what is known as a CUK converter is executed during the negative half-wave of the output alternating current.

Figure 7:
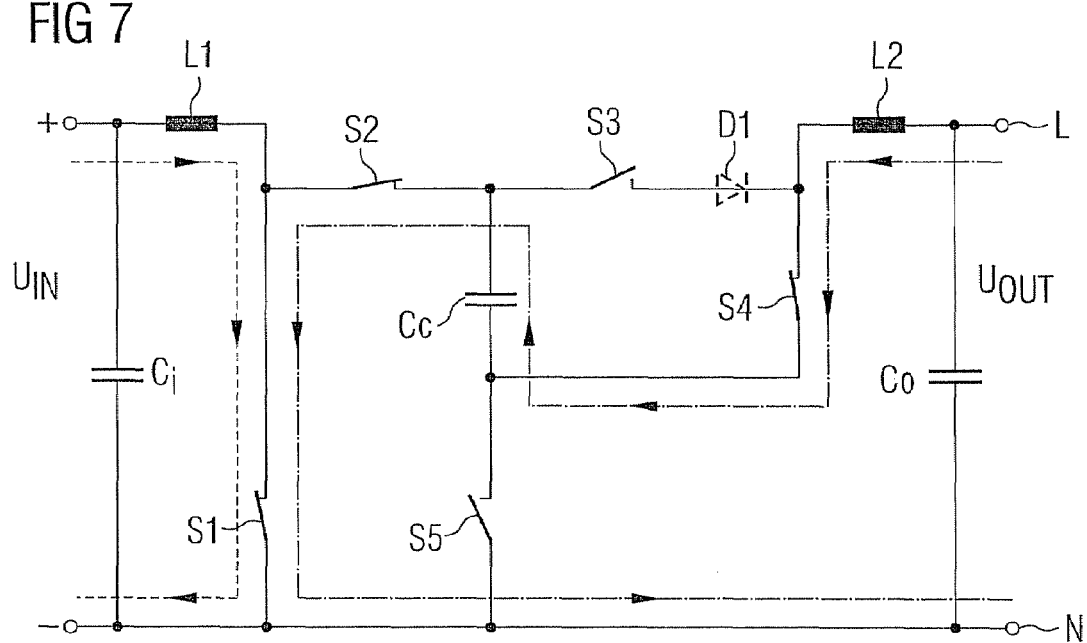

FIG. 7 shows the situation in which first, second and fourth semiconductor switch S1, S2, S4 are closed and third and fifth semiconductor switch S3, S5 are opened. A current path is formed between the positive pole of the direct current source $U_{IN}$ via the first choke L1 and the first semiconductor switch S1, and a second current path via the second choke L2, fourth semiconductor switch S4, first capacitor Cc, and also second and first semiconductor switch S2, S1 and the output alternating current network $U_{OUT}$.

Figure 8:
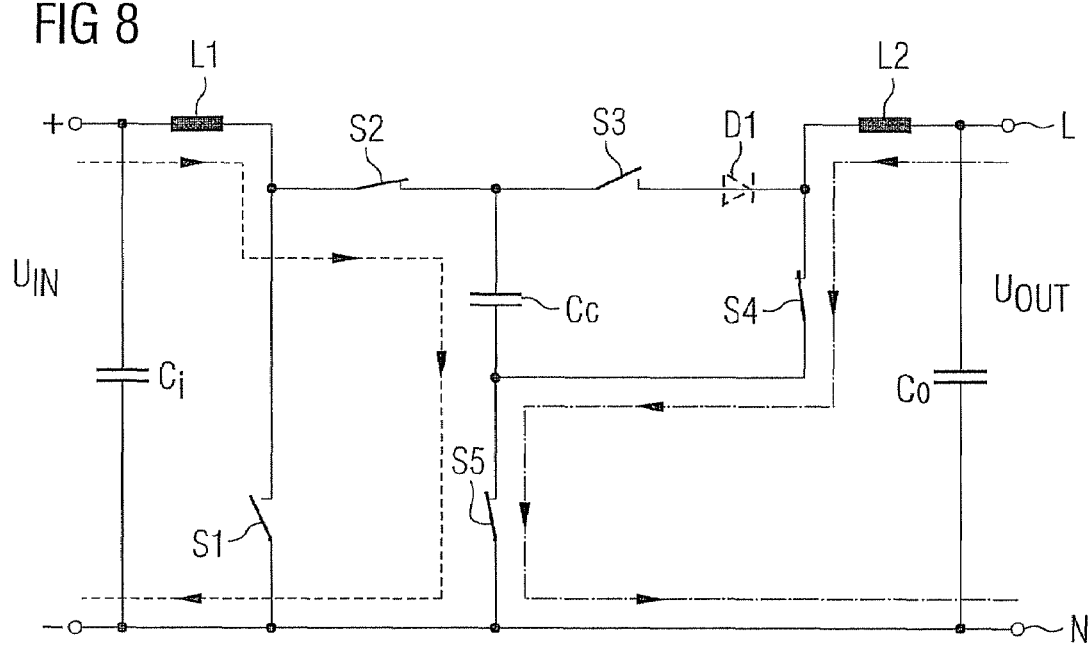

In the next switching process—as shown in FIG. 8—the first semiconductor switch S1 is opened and the fifth semiconductor switch S5 is closed in the opposing phase.

The circuits thus produced run on the one hand from the positive pole of the direct current source $U_{IN}$ via the first choke L1, the second semiconductor switch S2 via the first capacitor $C_C$ and the fifth semiconductor switch S5 to the negative pole of the direct current source $U_{IN}$ and on the other hand via the second choke L2, the fourth and the fifth semiconductor switch S4, S5, the alternating current network $U_{OUT}$.

FIG. 9 and FIG. 10 each show the typical sequence of the activation signals for the semiconductor switches S1, S2, S3, S4 and S5 respectively, with the two Figures showing different conceivable switching variants during the period of the positive half-wave of the output alternating voltage.

The invention claimed is:

1. A method for operating an electronically controlled inverter, comprising:
   controlling a positive half wave of an output alternating current in accordance with a step-up/step-down cascade;
   controlling a negative half wave of the output alternating current in accordance with a CUK converter; and
   providing a single-phase inverter having:
   two direct current terminals,
   two alternating current terminals,
   a plurality of semiconductor switches controlled by a plurality of microcontrollers, and
   a first limiting choke having a first side connected to a positive pole of a direct current source and a second side connected via a first semiconductor switch to a negative pole of the direct current source and the second side of the first choke is also connected via a series circuit of a second semiconductor switch and a third semiconductor switch to a first terminal of a second choke of which the second terminal is connected to a first terminal of an alternating current output, that the connection of second and third semiconductor switch via a first capacitor and a fifth semiconductor switch is connected via the second terminal of the alternating current output, that the negative pole of the direct current source is connected to the second terminal of the alternating current output and that the connection of first capacitor and fifth semiconductor switch is made via a fourth semiconductor switch with the first terminal of the second choke.

2. The method as claimed in claim 1, wherein the first, second, third and fourth semiconductor switches are pulsed and the fifth semiconductor switch is permanently switched on by microcontrollers during the positive half-wave of the output alternating current, and the first and second semiconductor switch as well as third and fourth semiconductor switch are each switched in the opposing phase and that during the negative half-wave of the output alternating current first and fifth semiconductor switch are switched pulsed in the opposing phase, and that in this period the second and the fourth semiconductor switch are switched on permanently and the third semiconductor switch is switched off permanently.

3. An inverter, comprising:
   an alternating current output having a first terminal and a second terminal;
   a direct current source having a negative terminal and a positive terminal;
   a first limiting choke having:
      a first side connected to a positive pole of a direct current source, and
      a second side connected to the negative pole of the direct current source by a first semiconductor switch;
   a second choke having:
      a first terminal connected to the second side of the first choke in series by a second semiconductor switch and a third semiconductor switch, and
      a second terminal connected to the first alternating current output terminal, wherein,
      the second alternating current output terminal is connected in series to a union of the second and third semiconductor switches by a first capacitor and a fifth semiconductor switch, and
      the negative terminal of the direct current source is connected to the second alternating current output terminal, and
      the first capacitor and the fifth semiconductor switch union is connected to the first terminal of the second choke by a fourth semiconductor switch; and
   a microcontroller that controls the first, second, third, fourth and fifth semiconductor switches so the inverter controls a positive half wave of an output alternating current in accordance with a step-up/step-down cascade and controls a negative half wave of the output alternating current in accordance with a CUK converter.

4. The inverter as claimed in claim 3, wherein the first, second, third and fourth semiconductor switches are pulsed and the fifth semiconductor switch is permanently switched on by microcontrollers during the positive half-wave of the output alternating current, and the first and second semiconductor switch as well as third and fourth semiconductor switch are each switched in the opposing phase and that during the negative half-wave of the output alternating current first and fifth semiconductor switch are switched pulsed in the opposing phase, and that in this period the second and the fourth semiconductor switch are switched on permanently and the third semiconductor switch is switched off permanently.

* * * * *

UNITED STATES PATENT AND TRADEMARK OFFICE
CERTIFICATE OF CORRECTION

PATENT NO. : 7,660,138 B2
APPLICATION NO. : 11/628901
DATED : February 9, 2010
INVENTOR(S) : Jalal Hallak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Thirtieth Day of November, 2010

David J. Kappos
*Director of the United States Patent and Trademark Office*